(12) United States Patent
Souissi et al.

(10) Patent No.: US 6,553,060 B2
(45) Date of Patent: Apr. 22, 2003

(54) METHOD AND APPARATUS FOR DYNAMIC SPECTRUM ALLOCATION

(75) Inventors: Slim Souissi, Ft. Worth, TX (US); Edgar H. Callaway, Jr., Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 33 days.

(21) Appl. No.: 09/967,282

(22) Filed: Sep. 28, 2001

(65) Prior Publication Data

US 2002/0009158 A1 Jan. 24, 2002

Related U.S. Application Data

(63) Continuation of application No. 09/425,923, filed on Oct. 25, 1999.

(51) Int. Cl.[7] .................................................. H04L 5/16
(52) U.S. Cl. ........................ 375/219; 375/135; 375/146
(58) Field of Search .................................. 375/130, 136, 375/219, 133, 220, 141, 257, 297, 146; 370/278, 282, 320, 329, 342, 335, 441, 459, 431; 405/84, 73, 24, 450, 464, 509, 451, 452, 406

(56) References Cited

U.S. PATENT DOCUMENTS

| | | | | |
|---|---|---|---|---|
| 5,909,183 A | * | 6/1999 | Borgstahl et al. | 340/825.22 |
| 6,005,884 A | * | 12/1999 | Cook et al. | 375/132 |
| 6,101,176 A | * | 8/2000 | Honkasalo et al. | 370/335 |
| 6,108,539 A | * | 8/2000 | Ray et al. | 455/430 |

* cited by examiner

Primary Examiner—Emmanuel Bayard
(74) Attorney, Agent, or Firm—Randi L. Dulaney

(57) ABSTRACT

A transceiver device (52 or 10) operates as a source of a data transmission in a communication system (50) capable of dynamically allocating spectrum for transmission of the data transmission between the transceiver device (52) and a second transceiver device (51). The transceiver device (10) includes a transmitter, a receiver coupled to the transmitter and a processor or controller (12) coupled to the transmitter and receiver. The transceiver device is programmed to monitor the spectrum (channels 1–13 of FIG. 3) to determine if a portion (channels 4–8 for example in time slot 8) of the spectrum is available. The transceiver determines what portion of the spectrum is desired for data transmission and then transmits (see time slots 11 and 13) the data transmission within a dynamically selected portion of the available spectrum.

5 Claims, 3 Drawing Sheets

METHOD AND APPARATUS FOR DYNAMIC SPECTRUM ALLOCATION

FIELD OF THE INVENTION

The present invention is directed to communication devices, and more particularly to communication devices capable of dynamically allocating spectrum for transmitting data. This application is a continuation of application Ser. No. 09/425,923 filed Oct. 25, 1999.

BACKGROUND OF THE INVENTION

Short range wireless communication and personal area networks will soon proliferate in common household products as well as mobile business products. Currently many products that have wireless capability are incompatible. Bluetooth technology allows for the replacement of the many proprietary cables that connect one device to another with one universal short-range radio link. Bluetooth technology could replace the cumbersome cables used today to connect a laptop to a cellular telephone or between other devices such as printers, PDA's, desktops, fax machines, keyboards, joysticks or virtually any other digital device. Refrigerators, microwave ovens, dish washers, laundry washers & dryers, stereo, television, digital video disks, video games, lighting, irrigation, cooling and heating systems among others may also take advantage of such short-range radio links.

Bluetooth radio technology further provides a universal bridge to existing data networks, a peripheral interface, and a mechanism to form small private ad hoc groupings of connected devices away from fixed network infrastructures. Designed to operate in a noisy radio frequency environment, the Bluetooth radio uses frequency hopping scheme to make the link robust. Bluetooth radio modules avoid interference from other signals by hopping to a new frequency after transmitting or receiving a data packet. What is needed is protocol that can efficiently use the given spectrum preferably by dynamically allocating spectrum in a manner that does not require constantly scanning of the given spectrum and further overcomes potential interference problems. Ideally, such a system can be compatible with Bluetooth 1.0, and Bluetooth 2.0 requirements such as high data rate, peer-to-peer networking, and low cost, but such compatibility should not be considered a limitation in accordance with the claimed invention.

DETAILED DESCRIPTION

Figure 1:
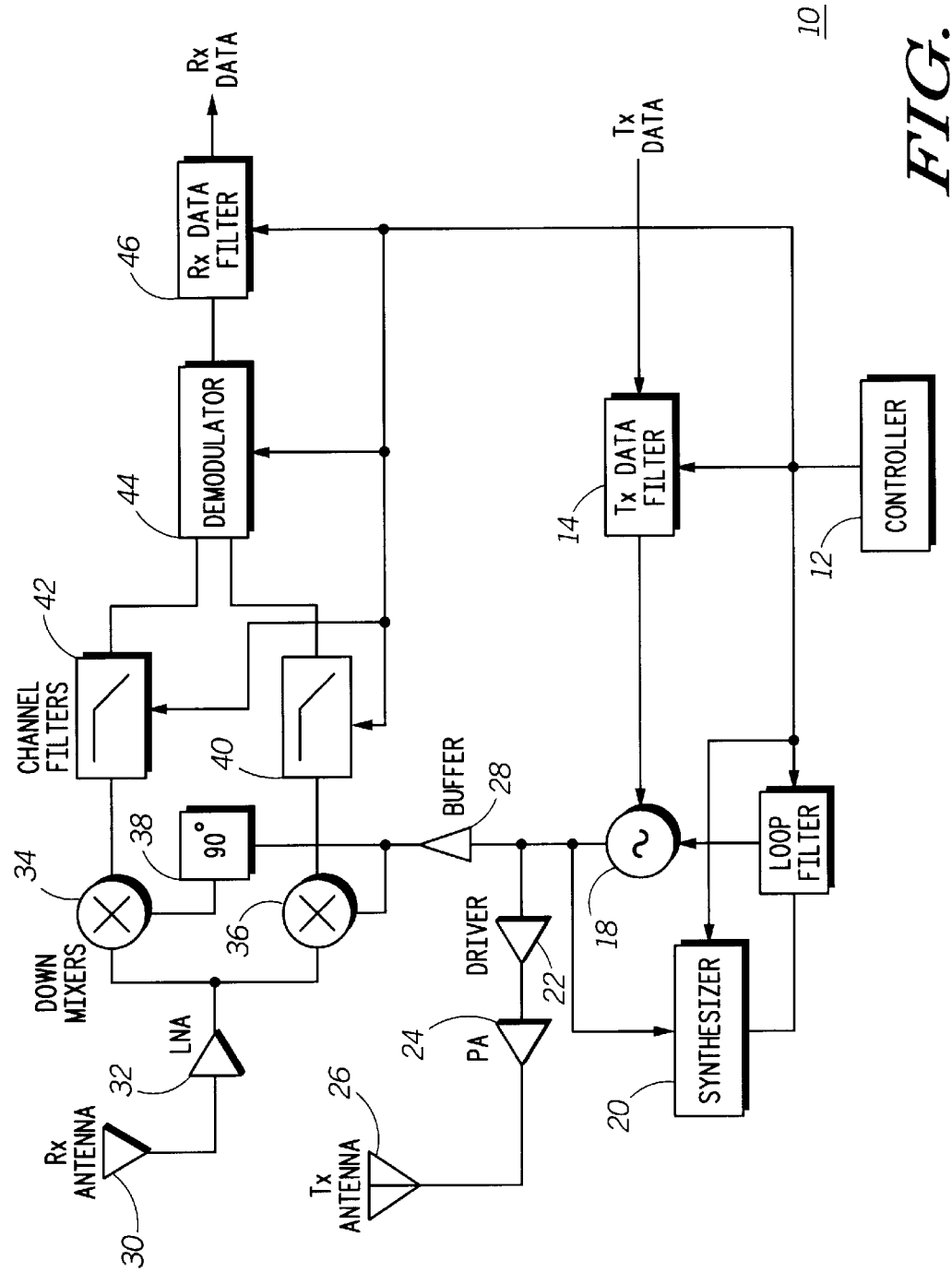
FIG. 1 is a block diagram of a transceiver in accordance with the present invention.

Referring to FIG. 1, a block diagram of a transceiver 10 in accordance with the present invention is shown. The transceiver preferably comprises transmitter and receiver sections. Both transmitter and receiver sections preferably utilize a processor or controller 12 that controls how data will eventually get transmitted and received by the transceiver 10. In the case of the transmitter section, the controller 12 is coupled to a transmitter data filter 14, loop filter 16 and synthesizer 20, which produce a modulated signal at the output of the voltage controlled oscillator (VCO) 18. A driver circuit 22 then provides the synthesized signal to a power amplifier 24 which is coupled to the transmitter antenna 26. In the case of the receiver section, the transceiver 10 preferably comprises a receive antenna 30 coupled to a low noise amplifier 32 to provide a received signal. The received signal is fed through down mixers 34 and 36 and channel filters 42 and 40 as shown to provide a filtered signal. The filtered signal is then demodulated through demodulator 44. A receive data filter 46 in conjuction with the controller 12 operates to decode the demodulated signal. A buffer circuit 28 couples the VCO 18 output to downmixer 36, and downmixer 34 through phaseshifter 38. The VCO output while receiving is, of course, unmodulated.

The processor or controller 12 is preferably coupled to the transmitter and receiver and programmed to poll a second transceiver device and subsequently receive a communication request from the second transceiver device to communicate on a high-speed link on a dynamically selected portion of the spectrum selected by the second transceiver device. The processor then monitors the selected portion of spectrum selected by the second transceiver device and acknowledges the request of the second transceiver device if the selected portion is acceptable. In the event the selected portion of the spectrum selected by the second transceiver device is unacceptable, the processor will monitor a remaining portion of the spectrum and select a second selected portion of the spectrum. The processor should also be programmed to receive an acknowledgement from the second transceiver device accepting the assignment of the spectrum selected by either the second transceiver device or the processor wherein the transceiver device receives the data on a high speed channel utilizing the selected portion of the spectrum. It should be noted that the transceiver device 10 can be a portable electronic device having a self-contained energy source or alternatively by powered by an external energy source. Additionally, the transceiver device can be coupled to a widely distributed network such as the internet.

Figure 2:
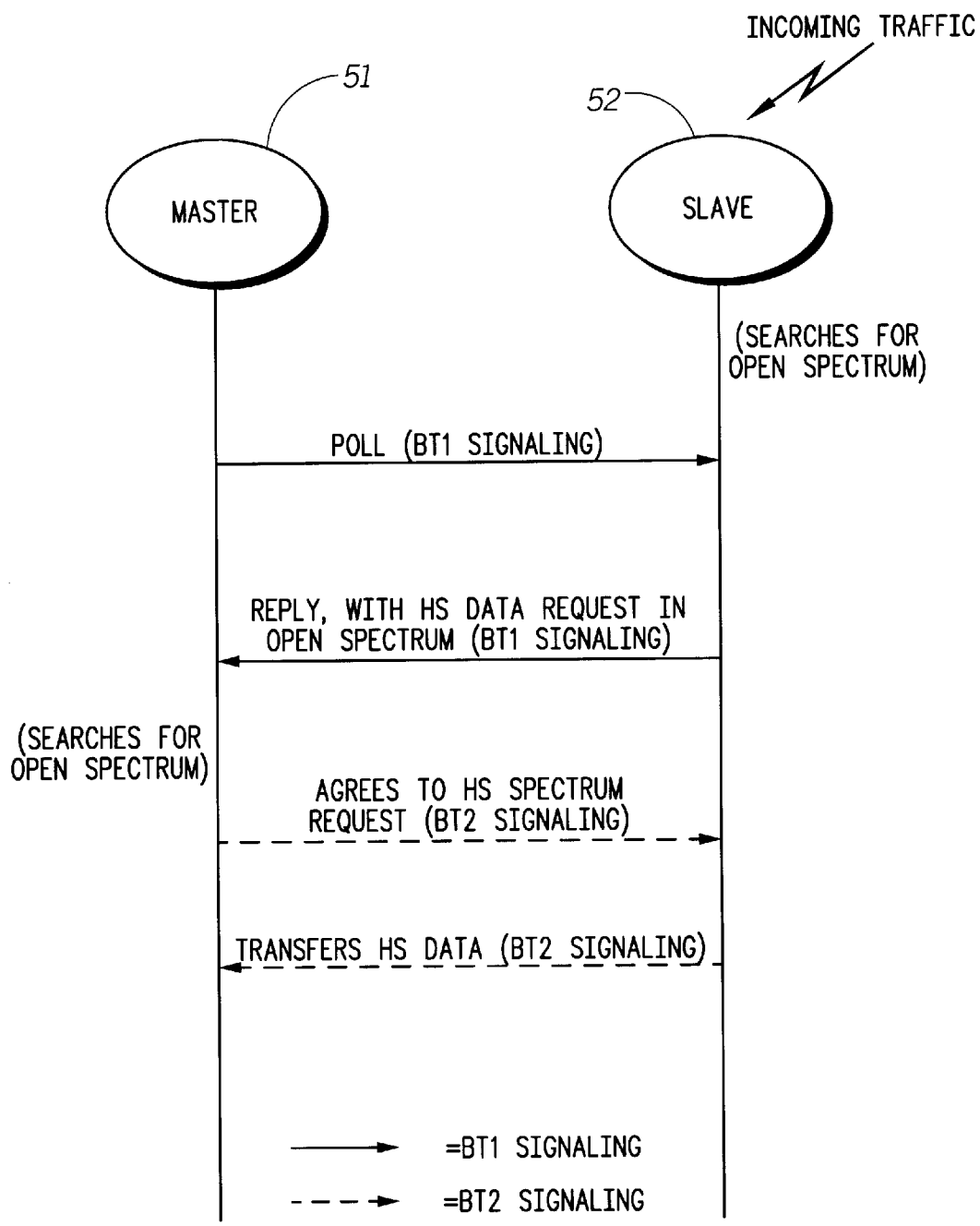
FIG. 2 is a block diagram of a wireless network system in accordance with the present invention where a master polls a slave and a slave requests a high speed channel using open spectrum that is dynamically selected.

Referring to FIG. 2, a block diagram of a wireless network system 50 in accordance with the present invention is shown where a master 51 polls a slave 52 and the slave 52 requests a high speed channel that would employ open spectrum that is dynamically selected. Initially, it is assumed that data traffic to be sent to the master has just arrived at the slave 52 and the master is maintaining the piconet, e.g., polling the slaves (just one slave shown). When a poll by the master 51 is not scheduled, slave 52 searches a predetermined spectrum for the best available downlink communication resources or channels. In a Bluetooth communication system, the predetermined spectrum is ideally the ISM band. Next, the master 51 polls the slave 52 by transmitting data of a first type in a first occupied bandwidth. Preferably, this transmission is of a standard Bluetooth 1.0 type transmission. The slave 51 then requests the establishment of a high-speed link with the master 52 preferably using the standard Bluetooth 1.0 type signalling and suggesting the best available downlink channel (master-to-slave) just found. The master 52 verifies the channels suggested by the slave 51. If the master 52 finds the channels suggested by the slave 51 as an acceptable uplink (slave-to-master), the master 52 acknowledges the request of the slave 51 and signals its acceptance on the new downlink channel (high-speed) channel. This high-speed channel would facilitate the transmission of data of a second type in a second occupied bandwidth wherein the second occupied bandwidth would be of variable bandwidth suitable for the transmission of the data. For instance, if a large amount of data needed transmitting, then multiple channels over multiple time slots could be used. If a small amount of data needed transmitting, then a few channels could be used over a single time slot. The time slots and channels may vary depending on the amount of data to be transmitted, the interference seen on the predetermined spectrum, the data rate desired, the type of modulation used for the transmission of the data, and the type of security desired, among other considerations.

If the master 52 finds the channels suggested by the slave 51 as unacceptable, the master 52 will ideally search the ISM band for the best alternative channels, which are then sent to the slave 51 on the new downlink channel. In this way, the master 52 and the slave 51 may transmit on different channels ("split frequency operation") although ideally in the interest of spectral efficiency the master and slave will attempt to reuse the same channels on their first attempt.

Alternatively, if the master finds the channels suggested by the slave 51 unacceptable, the master 52 will ideally search the ISM band for the best alternative channels, which are then suggested to the slave 51 on the new downlink channel. A negotiation ensues, with rules that include the options to decide to use any common channels between the master's and the slave's proposals. Once the data is transmitted, the master and slave revert to Bluetooth 1.0 type communications.

The negotiation described in the alternative embodiment is particularly useful in the case where the master sees low interference on a given channel and attempts to assign the given channel to the slave wherein the slave (from its perspective) sees high interference on the given channel. The link cannot be established from the master to the slave because there is a hidden (from the master) interferer that is causing an interference problem. The present overcomes the problem by allowing the slave to scan the spectrum for a interference noise (or clear) channel and utilize an alternative channel to the channel or channels suggested by the master. This technique will work equally well if there is a hidden interferer from the slave that is causing sufficient interference to disrupt establishment of the uplink (from the slave to the master).

In yet another alternative mode, the slave could blindly send the master a recommendation without scanning or checking the spectrum based on prior communication history between the master and the slave. For instance, if the chosen spectrum was found clear (from interference) for a predetermined time or for a predetermined number of data packets sent between the devices, then the slave can proceed to communicate on the high-speed channel without scanning. Similarly, the master can also attempt establishing communication blindly without scanning based on the same historical analysis. If communications fail under such conditions, the communication devices revert to the scanning mode as before.

Allowing the slave devices in a piconet to perform the scanning only when there is a need for a high-speed channel provides the benefits of battery saving since the spectrum (in the case of Bluetooth, the ISM band) would be searched only when there is data to be sent. In general, the searching would be more evenly spread out among all devices in a piconet so that no one device suffers a particular battery life penalty. The additional benefit in a negotiated call setup is that the channel would be checked for quietness on both ends of the link, thus eliminating the concern of having a noise source near the slave that is not heard by the master when checking the channel. The only penalty is the longer "call setup" latency incurred in the negotiation.

In another embodiment of the present invention, if a communication device had no real concerns for battery life such as a non-portable master (or slave) device coupled to the mains electrical supply, then the master (or slave) could continuously monitor the spectrum and maintain a list of contiguous (or non-contiguous as the case may be) channels on which high speed transmissions can be initiated. Ideally, a master in a Bluetooth scheme would assign the best available channels to the Bluetooth 2.0 devices and inform them about the amount of bandwidth allocated for the transmission. The amount of bandwidth allocated depends as previously stated on the required data rate and the ISM band conditions among other considerations. By adaptively allocating spectrum to the Bluetooth 2.0 devices or any communication devices in accordance with the present invention, system efficiency is greatly enhanced.

Figure 3:
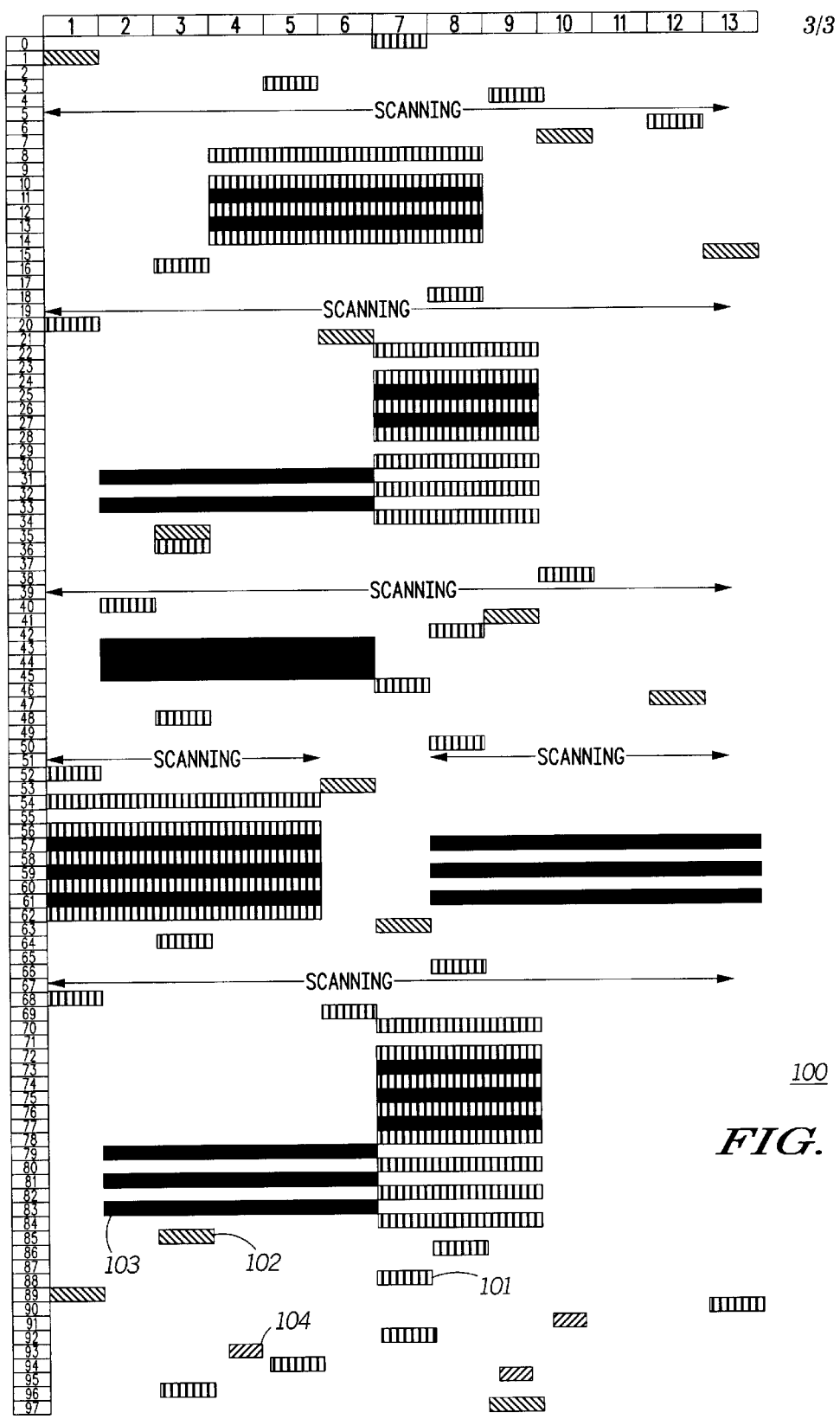
FIG. 3 is a timing diagram illustrating various scenarios where a transceiver would operate in accordance with the present invention.

Referring to FIG. 3, a timing diagram 100 illustrating various scenarios and methods are shown where a transceiver would operate in accordance with the present invention. The timing diagram hypothetically shows a spectrum divided equally among 13 channels on the horizontal axis and 97 time slots on the vertical axis. Throughout FIG. 3, also note as an example that the type of vertical cross hatching used on occupied bandwidth 101 represents periods when a master is transmitting and a slave is listening; the type of diagonal cross-hatching used on occupied bandwidth 102 represents periods when the slave transmits using BT1 signaling; the type of diagonal cross-hatching used on occupied bandwidth 104 represents periods when the slave transmits using BT3 signaling; and the type of solid lines used on occupied bandwidth 103 diagonal represents periods when the slave transmits using BT2 signaling. At time slot 0, the master polls the slave and the slave listens. The signaling that occurs from time slot 0 to time slot 7 as shown involves the transmission of data of a first type in a first occupied bandwidth. We will refer to this first type of signaling in a Bluetooth scenario as Bluetooth 1.0 or BT1 signaling. BT1 signaling typically involves bandwidths that are of a fixed size, in this case occupying one (1) frequency channel. The present invention as claimed is not intended to be limited in bandwidth in any of the signaling, but compatibility with Bluetooth 1.0 may require such limitation. At time slot 1, the slave responds with an acknowledgement. The master polls another slave in the piconet during time slot 2. There should be no response from the slave in time slot 3. The master continues to poll another slave while data comes into the slave at time slot 4. Up to this point, this sequence is essentially describes Bluetooth 1.0 operations (except that the ISM band actually has many more channels that are used instead of the 13 shown here). Now, under the present invention, the slave would scan the band for available spectrum on time slot 5 and finds that in this instance frequency channels 4 through 8 are clear or available. Time slot 6 shows the master polling the slave. The slave responds in time slot 7 with an acknowledgement and the suggested spectrum (frequency channels 4–8) for transmission of data. The master using a second type of data on a second occupied bandwidth acknowledges the slave's spectrum request in time slot 8 (using the slave's suggested spectrum) and subsequently scans the band (the ISM band in the case of Bluetooth) for available spectrum during time slot 9. The second type of data and the second occupied bandwidth will be referred to in a Bluetooth scenario as Bluetooth 2.0 or BT2 signaling. BT2 signaling is preferably a high-speed link that utilizes a bandwidth of variable size sufficient for the transmission of the data. It should be noted that the second occupied bandwidth does not necessarily need to be a high-speed link. It may be any type of link that is dynamically allocated in terms of bandwidth, data rate, modulation or otherwise.

As of a result of scanning, the master determines that the same preferable frequency channels 4–8 are suitable. In time slot 10, the master responds with its proposed receive spectrum (frequency channels 4–8). The slave then sends a first data packet using frequency channels 4–8 in time slot 11 using the high-speed link. The master acknowledges the first data packet in time slot 12. The slave then sends a final data packet in time slot 13. The master acknowledges the final data packet in time slot 14 and returns to BT1 signaling. In time slot 15, the slave confirms its return to BT1 signaling. The master goes on to poll other slaves in the piconet in time slot 16 and the slave does not respond in time slot 17.

As in time slot 4, while the master polls another slave in time slot 18 using BT1 signaling, the slave receives data to be transmitted and the slave scans the band for available spectrum on time slot 19 and finds that in this instance frequency channels 7 through 9 are clear or available from the slave's perspective. Time slot 20 shows the master polling the slave using BT1 signaling. The slave responds in time slot 21 with an acknowledgement and the suggested spectrum (frequency channels 7–9) for transmission of data and the master acknowledges the spectrum request in time slot 22 using BT2 signaling. In time slot 23, the master scans the band for available spectrum. The master responds in time slot 24 with its proposed spectrum, which also happens to be the preferred channels 7–9. In time slot 25, the slave sends a first data packet on channels 7–9. The master negatively acknowledges the first data packet in time slot 26. The slave resends the first data packet on in time slot 27, but the master negatively acknowledges the first data packet again in time slot 28 and informs the slave that it will scan for alternative spectrum. The master scans during time slot 29 and responds in time slot 30 with new proposed receive spectrum. The slave then repeats transmission of the first data packet in time slot 31 using BT2 signaling with a different bandwidth encompassing channels 2 through 6. Note that the data that was previously sent on three channels (channels 7–9) is now spread over 5 channels (channels 2–6). This illustrates that the dynamic selection of spectrum can have a variable channel bandwidth that will preferably be sufficient to transmit the data. Additionally, in Bluetooth scenario, the high speed link using the second occupied bandwidth preferably utilizes a data rate higher than that used during the transmission occupying the first bandwidth. Now note that the master acknowledges the first data packet in time slot 32 on channels 7–9 while the slave continues to send data on the new assigned channels (2–6). The slave sends the second and final data packet in time slot 33 and the master acknowledges in time slot 34 before resuming BT1 signaling. Here is an example where the master was subject to a hidden interferer in times slot 25 through 28 that only the slave could see. The newly assigned receive channels for the master (or transmit channels for the slave) are now free from hidden interferers as indicated by the subsequent successful exchange.

In time slot 35, the slave confirms its return to BT1 signaling and as before the master will poll another slave in the piconet in the subsequent time slot 36. During time slot 37, the slave of course does not respond to the master's polling of other slaves. Once again, as the master polls another slave in time slot 38, data comes in to the slave and the slave will scan in the subsequent time slot 39 for available spectrum. In time slot 40, the master polls the slave and the slave responds in time slot 41 with an acknowledgement and its proposed receive spectrum for continuous data transmission. In time slot 42, the master acknowledges the spectrum request without scanning and tells the slave to transmit on channels 2 through 6 on the next time slot since they were recently unoccupied. This illustrates a method where monitoring is discontinued before transmitting the data within the selected portion of the spectrum when a predetermined number of data packets or a predetermined time suggests a high probability that the selected portion of the spectrum will not be subjected to interference. In other words, the step of monitoring can be omitted when there is errorless reception of a predetermined number of data packets or errorless reception for a predetermined time. Thus, (without prior scanning by the master) the slave transmits the data on channels 2–6 for three continuous time slots, namely time slots 43, 44 and 45 using BT2 signaling. At time slot 46, the master acknowledges and resumes BT1 signaling and the slave confirms its return to BT1 signaling in time slot 47. As before, the master polls another slave, the slave does not respond, and the master polls some other slave(s) while data comes into the slave on time slots 48, 49, and 50 respectively. The slave subsequently scans the band for available spectrum in time slot 51. The master polls the slave on time slot 52 and the slave responds on time slot 53 with an acknowledgement and its proposed receive spectrum for data transmission. The master acknowledges the spectrum request in time slot 54 using BT2 signaling and the master subsequently scans the band for available spectrum in time slot 55. The master then responds to the slave on time slot 56 with its proposed receive spectrum. The slave accepts and sends the first data packet in a discontinuous spectrum during time slot 57. In this case the discontinuous spectrum comprises channels 1–6 and channels 8–13. The master acknowledges receipt of the first data packet during time slot 58 on its receive spectrum, namely only channels 1–6. The slave continues to send a second data packet on the discontinuous spectrum during time slot 59 and the master again acknowledges on time slot 60. The slave sends its final data packet during time slot 61 and the master acknowledges the final data packet during time slot 61 before returning to BT1 signaling. The slave then confirms its return to BT1 signaling in time slot 63. As shown above, the dynamically selected portion of the spectrum can include multiple contiguous time slots or non-contiguous spectrum.

As before the master will poll another slave in the piconet in the subsequent time slot 64. During time slot 65, the slave of course does not respond to the master's polling of another slave. Once again, as the master polls another slave in time slot 66, data comes in to the slave and the slave will scan in the subsequent time slot 67 for available spectrum. In time slot 68, the master polls the slave and the slave responds in time slot 69 with an acknowledgement and its proposed receive spectrum for data transmission. In time slot 70, the master acknowledges the spectrum request using BT2 signaling on channels 7–9. The master subsequently scans the band for available spectrum during time slot 71 and responds to the slave on time slot 72 with its proposed receive spectrum. At time slot 73, the slave accepts and sends a first data packet. The master negatively acknowledges the first data packet during time slot 74 and the slave then repeats the transmission during time slot 75. The master operating in a duplex mode during time slot 76 simultaneously negatively acknowledges the slave's first data packet while the master also scans for available spectrum. This illustrates a method of monitoring a remainder of the spectrum while the source of the transmission is transmitting to the selected portion of the spectrum (in this case, the master negatively acknowledging the prior data packet on channels 7–9) The slave attempts to send data on channels 7–9 again during time slot 77, but the master again negatively acknowledges the first data pack during time slot 78. Also during time slot 78, the master proposes new spectrum for the slave to transmit in. The slave then transmits data on the new proposed spectrum (channels 2–6) during time slot 79 and the master acknowledges the first data packet during time slot 80. The slave sends a second and then a final data packet during time slots 81 and 83 respectively and the master acknowledges these data packets during times slots 82 and 84 respectively. The master returns to BT1 signaling and the slave confirms its return to BT1 signaling during time slot 85. The master then polls another slave on the piconet during time slot 86 and the slave does not respond during time slot 87. When the master polls the slave on time slot 88, the slave responds in time slot 89 with an acknowledgement and a request to use third occupied spectrum that we will call Bluetooth 3.0 or BT3 signaling. BT3 signaling is a form of narrow spectrum signaling that would greatly enhance battery life and reduce the risk of interference on a given piconet. In relation, the first occupied bandwidth is less than the second occupied bandwidth and the third occupied bandwidth is smaller than the first occupied bandwidth. With regard to Bluetooth signaling bandwidth, it can be simply stated that BT3<BT1<BT2.

During time slot 90, the master accepts the new signaling. The slave then transmits data in time slot 91 using BT3 signaling. The master acknowledges the data during time slot 92 using BT1 signaling. The slave continues to transmit data in time slot 93 and the master again acknowledges during time slot 94. The slave during time slot 95 and still signaling in BT3 finally proposes returning to BT1 signaling. The master accepts during time slot 96 and the slave confirms its return to BT1 signaling during time slot 97.

The timing diagram of FIG. 3 illustrates a method of dynamic spectrum allocation for transmission comprising the steps at a source (or the slave in this instance) of the transmission of monitoring the spectrum as shown at time slot 5 and determining the what portion of the spectrum is desired for transmitting the data as done in time slot 7. Finally, the data is transmitted within the selected portion of the spectrum as shown in time slots 11 and 13. It should be noted that the selected portion of the spectrum can be either contiguous as shown in time slots 11, 13, and 43–45 or non-contiguous as shown in time slots 57, 59, and 61. It should also be noted that the step of monitoring the spectrum can comprise monitoring just the portion of the spectrum desired as shown at time slot 51 where only channels 1–5 and 8–13 are monitored rather than the whole band (channels 1–13).

In the example shown in FIG. 3, data sent using BT1 signaling represents data of a first type in a first occupied bandwidth and BT2 signaling represents data of a second type in a second occupied bandwidth wherein the first occupied bandwidth is preferably significantly less than the second occupied bandwidth. Data that could be transmitted during a transmission occupying the first bandwidth could include transmission parameters for subsequent transmissions using the second occupied bandwidth. The parameters could include data rate, modulation, frequency, hopping sequence, and bandwidth among other parameters that can be sent in the form of a table or database. If an error is detected by a receiver of the data (the master), then the data can be retransmitted in a second selected portion of the spectrum as shown in time slot 31. Data transmitted using BT3 signaling represents data of a third type in a third occupied bandwidth and wherein the third occupied bandwidth is preferably less than the first occupied bandwidth.

The above description is intended by way of example only and is not intended to limit the present invention in any way except as set forth in the following claims.

What is claimed is:

1. A method of dynamic spectrum allocation for transmission of data within a frequency band, comprising the steps at a source of the transmission of:

monitoring the spectrum by scanning the frequency band to determine an available portion of the spectrum;

determining a desired portion of the available portion of the spectrum for the data to be transmitted;

transmitting the data within the desired portion of the spectrum, wherein the transmitting of the data comprises the step of transmitting data of a first type in a first occupied bandwidth and the step of transmitting data of a second type in a second occupied bandwidth wherein the first occupied bandwidth is significantly less than the second occupied bandwidth; and monitoring a remainder of the spectrum while the source of the transmission is transmitting to the desired portion of the spectrum.

2. A method of dynamic spectrum allocation for transmission of data within a frequency band, comprising the steps at a source of the transmission of:

monitoring the spectrum by scanning the frequency band to determine an available portion of the spectrum;

determining a desired portion of the available portion of the spectrum for the data to be transmitted; and transmitting the data within the desired portion of the spectrum, wherein the transmitting of the data comprises the step of transmitting data of a first type in a first occupied bandwidth and the step of transmitting data of a second type in a second occupied bandwidth wherein the first occupied bandwidth is significantly less than the second occupied bandwidth, wherein the portion of the spectrum selected in the monitoring, determining, and transmitting steps is a variable channel bandwidth sufficient to transmit the data.

3. A method of dynamic spectrum allocation for transmission of data within a frequency band, comprising the steps at a source of the transmission of:

monitoring the spectrum by scanning the frequency band to determine an available portion of the spectrum;

determining a desired portion of the available portion of the spectrum for the data to be transmitted;

transmitting the data within the desired portion of the spectrum, wherein the transmitting of the data comprises the step of transmitting data of a first type in a first occupied bandwidth and the step of transmitting data of a second type in a second occupied bandwidth wherein the first occupied bandwidth is significantly less than the second occupied bandwidth; and receiving an incoming data input that will require a high speed data link on the selected portion of the spectrum.

4. A method of dynamic spectrum allocation for transmission of data within a frequency band, comprising the steps at a source of the transmission of:

monitoring the spectrum by scanning the frequency band to determine an available portion of the spectrum;

determining a desired portion of the available portion of the spectrum for the data to be transmitted; and transmitting the data within the desired portion of the spectrum, wherein the transmitting of the data comprises the step of transmitting data of a first type in a first occupied bandwidth and the step of transmitting data of a second type in a second occupied bandwidth wherein the first occupied bandwidth is significantly less than the second occupied bandwidth, wherein the method discontinues monitoring before transmitting the data within the desired portion of the spectrum when a predetermined number of data packets or a predetermined time suggests a high probability that the desired portion of the spectrum will not be subject to debilitating interference.

5. The method of claim 4, wherein the method discontinues monitoring when the source of the transmission has errorless reception of a predetermined number of data packets or has errorless reception of data packets for a predetermined period of time.

* * * * *